US007769592B2

(12) United States Patent
Kemble et al.

(10) Patent No.: US 7,769,592 B2
(45) Date of Patent: Aug. 3, 2010

(54) AUTOMATIC SELECTION OF A DISAMBIGUATION DATA FIELD FOR A SPEECH INTERFACE

(75) Inventors: Kimberlee A. Kemble, Boca Raton, FL (US); James R. Lewis, Delray Beach, FL (US); Vanessa V. Michelini, Boca Raton, FL (US); Margarita Zabolotskaya, Boynton Beach, FL (US)

(73) Assignee: Nuance Communications, Inc., Burlington, MA (US)

( * ) Notice: Subject to any disclaimer, the term of this patent is extended or adjusted under 35 U.S.C. 154(b) by 1286 days.

(21) Appl. No.: 10/081,502

(22) Filed: Feb. 22, 2002

(65) Prior Publication Data

US 2003/0163319 A1 Aug. 28, 2003

(51) Int. Cl.
*G10L 15/00* (2006.01)

(52) U.S. Cl. .................... 704/275; 704/270; 704/270.1

(58) Field of Classification Search ............... 707/1–10; 704/270–275, 226, 208, 251, 257
See application file for complete search history.

(56) References Cited

U.S. PATENT DOCUMENTS

| 4,058,676 | A | 11/1977 | Wilkes et al. ................... 179/1 |
| 4,674,112 | A | 6/1987 | Kondraske et al. ............ 379/96 |
| 4,852,180 | A | 7/1989 | Levinson ...................... 381/43 |
| 5,214,689 | A | 5/1993 | O'Sullivan ................... 379/88 |
| 5,694,559 | A | 12/1997 | Hobson et al. ............... 395/336 |
| 5,812,998 | A * | 9/1998 | Tsutsumi et al. ................ 707/2 |
| 5,917,890 | A | 6/1999 | Brotman et al. ........... 379/88.01 |
| 5,930,788 | A | 7/1999 | Wical ............................ 707/5 |
| 5,940,493 | A | 8/1999 | Desai et al. .................. 379/260 |
| 5,945,928 | A | 8/1999 | Kushler et al. ................ 341/28 |
| 6,049,799 | A | 4/2000 | Mangat et al. ................ 707/10 |
| 6,094,476 | A | 7/2000 | Hunt et al. ............... 379/88.04 |
| 6,101,492 | A | 8/2000 | Jacquemin et al. ............. 707/3 |
| 6,130,962 | A | 10/2000 | Sakurai ....................... 382/190 |
| 6,256,630 | B1 * | 7/2001 | Gilai et al. ..................... 707/6 |
| 6,418,431 | B1 * | 7/2002 | Mahajan et al. ................ 707/4 |
| 6,421,672 | B1 * | 7/2002 | McAllister et al. ............ 707/10 |

OTHER PUBLICATIONS

N. Uramoto, Structural Disambiguation Method Using Extraction of Unknown Words From an Example-Base, *IBM Technical Disclosure Bulletin*, Vo. 38, No. 8, pp. 357-358, (Aug. 1995).

* cited by examiner

*Primary Examiner*—David R Hudspeth
*Assistant Examiner*—Abdelali Serrou
(74) *Attorney, Agent, or Firm*—Wolf, Greenfield & Sacks, P.C.

(57) ABSTRACT

A method of disambiguating database search results can include retrieving multiple database entries responsive to a database search. The retrieved database entries can include a plurality of common data fields. The retrieved database entries can be processed according to predetermined speech interface criteria. At least one data field can be selected from the plurality of common data fields for uniquely identifying each retrieved database entry. The data items corresponding to the selected data field for each retrieved database entry can be presented through a speech interface.

8 Claims, 2 Drawing Sheets

| Entry | Name | Formal Name | Phone | Location | Job Description | Dept. Number | Dept. Name |
|---|---|---|---|---|---|---|---|
| 1 | Joe Smith | Joseph B. Smith | 7-777999 | United Kingdom | Programmer | AXPN | Netfinity Service and Support |
| 2 | Joe Smith | Joseph P. Smith | 777-7777 | Las Vegas | Global Services | 55TU | Las Vegas Large/Mid Range |
| 3 | Joe Smith | Joseph R. Smith | 987-6543 | West Palm Beach | Human Factors | AMXI | Speech SOL Test and Technology Support |
| 4 | Joe Smith | Joe Smith | 7-123456 | Hursley | Contractor | 111123 | Systems Support |
| 5 | Joe Smith | Joe Smith | 000-0000 | Chicago | Technician | ONDI | Starwood |
| 6 | Joe Smith | Joe Smith | 456-7890 | Poughkeepsie | Business Planner | AB9Z | TMF Application Data Transfer Service Development |
| 7 | Joe Smith | Joseph R. Smith | 123-4567 | Austin | Engineer | QPR2 | VTS Coupled Systems |
| 8 | Joe Smith | Joseph R. Smith | 999-9999 | Tucson | Global Services | 6CQV | Customer Service Data Management |
| Analysis | Failed Duplicate | Failed Duplicate | Failed Cannot Pronounce | 9.5 Characters 2.875 Syllables | 12.125 Characters 3.75 Syllables | Failed Cannot Pronounce | Failed Items Too Long |

| Entry | Name | Formal Name | Phone | Location | Job Description | Dept. Number | Dept. Name |
|---|---|---|---|---|---|---|---|
| 1 | Joe Smith | Joseph B. Smith | 7-777999 | United Kingdom | Programmer | AXPN | Netfinity Service and Support |
| 2 | Joe Smith | Joseph P. Smith | 777-7777 | Las Vegas | Global Services | 55TU | Las Vegas Large/Mid Range |
| 3 | Joe Smith | Joseph R. Smith | 987-6543 | West Palm Beach | Human Factors | AMXI | Speech SOL Test and Technology Support |
| 4 | Joe Smith | Joe Smith | 7-123456 | Hursley | Contractor | 111123 | Systems Support |
| 5 | Joe Smith | Joe Smith | 000-0000 | Chicago | Technician | ONDI | Starwood |
| 6 | Joe Smith | Joe Smith | 456-7890 | Poughkeepsie | Business Planner | AB9Z | TMF Application Data Transfer Service Development |
| 7 | Joe Smith | Joseph R. Smith | 123-4567 | Austin | Engineer | QPR2 | VTS Coupled Systems |
| 8 | Joe Smith | Joseph R. Smith | 999-9999 | Tucson | Global Services | 6CQV | Customer Service Data Management |
| Analysis | Failed Duplicate | Failed Duplicate | Failed Cannot Pronounce | 9.5 Characters 2.875 Syllables | 12.125 Characters 3.75 Syllables | Failed Cannot Pronounce | Failed Items Too Long |

Figure 1

AUTOMATIC SELECTION OF A DISAMBIGUATION DATA FIELD FOR A SPEECH INTERFACE

BACKGROUND OF THE INVENTION

1. Technical Field

The present invention relates to the field of speech recognition, and more particularly, to speech-based user interfaces.

2. Description of the Related Art

Speech interfaces are frequently used in conjunction with database-driven systems to provide users with a speech-based method of searching for information. One common example of such a system is a telephone directory system where a user can verbally specify an argument, such as a name, for which the speech-enabled system can search. Speech interfaces can work effectively in cases where a database search returns a single search result. If the search returns multiple search results, however, the search effectively fails unless the user is provided with an opportunity to select, or disambiguate, one search result from the multiple search results.

Disambiguation within a visual environment can be accomplished with relative ease in comparison with disambiguation in an audio environment. In a visual environment, search results are displayed to the user so that the user then can make a selection. Disambiguation within a speech interface, however, can be problematic. Specifically, each search result is played to the user, data field by data field. Playing search results in this manner can result in a confusing and nonsensical playback of the search results. The search results effectively serve as long and confusing speech menu items which can be difficult for the user to remember when making a selection. Moreover, some data items can be unpronounceable by the speech interface.

One solution has been to play only search result contents from predetermined data fields in an effort to reduce speech menu item size. If, however, the selected data field includes duplicate data items among the search results, the search results cannot be disambiguated by the predetermined data field. In that case, the user hears what can sound like duplicate speech menu items, despite the fact that each speech menu item corresponds to a different search result.

SUMMARY OF THE INVENTION

The invention disclosed herein provides a method and apparatus for disambiguating multiple database search results. More specifically, the invention can analyze database search results to determine a data field suitable for uniquely identifying each search result when presented through a speech interface. Accordingly, users can select a desired search result without having to view a listing of the search results on a display.

One aspect of the present invention can include a method of disambiguating a database search results. The method can include retrieving multiple database entries responsive to a database search. The retrieved database entries can include a plurality of common data fields. The retrieved database entries can be processed according to predetermined speech interface criteria. For example, data fields of the retrieved database entries which have common data items can be excluded from further processing, data fields of the retrieved database entries having pronounceable data items can be identified, and a data field from the plurality of common data fields having data items with a smallest average length can be determined. Additionally, a data field from the plurality of common data fields having data items which do not exceed a predetermined maximum threshold can be determined. Regardless, at least one data field from the plurality of common data fields can be selected for uniquely identifying each of the retrieved database entries. The data items corresponding to the selected data field for each retrieved database entry then can be presented through a speech interface.

Another aspect of the present invention can include a method of disambiguating database search results wherein multiple database entries can be retrieved responsive to a database search. The retrieved database entries can include a plurality of common data fields. The retrieved database entries can be processed according to predetermined speech interface criteria; and, at least one of the data fields from the plurality of common data fields can be selected which can uniquely identify each retrieved database entry. A query can be issued, for example to a user, to determine which one of the common data fields, which can uniquely identify each of the retrieved database entries, is to be used to disambiguate the retrieved database entries.

The method further can include receiving a user input selecting one of the common fields which can uniquely identify each of the retrieved database entries. Another user input specifying a data item associated with the selected data field can be received to disambiguate the retrieved database entries. Alternatively, data items associated with the selected data field automatically can be presented through a speech interface for each retrieved database entry.

BRIEF DESCRIPTION OF THE DRAWINGS

There are shown in the drawings embodiments which are presently preferred, it being understood, however, that the invention is not so limited to the precise arrangements and instrumentalities shown.

FIG. 1 is an excerpt from an exemplary database after having performed a database search.

DETAILED DESCRIPTION OF THE INVENTION

Figure 2:
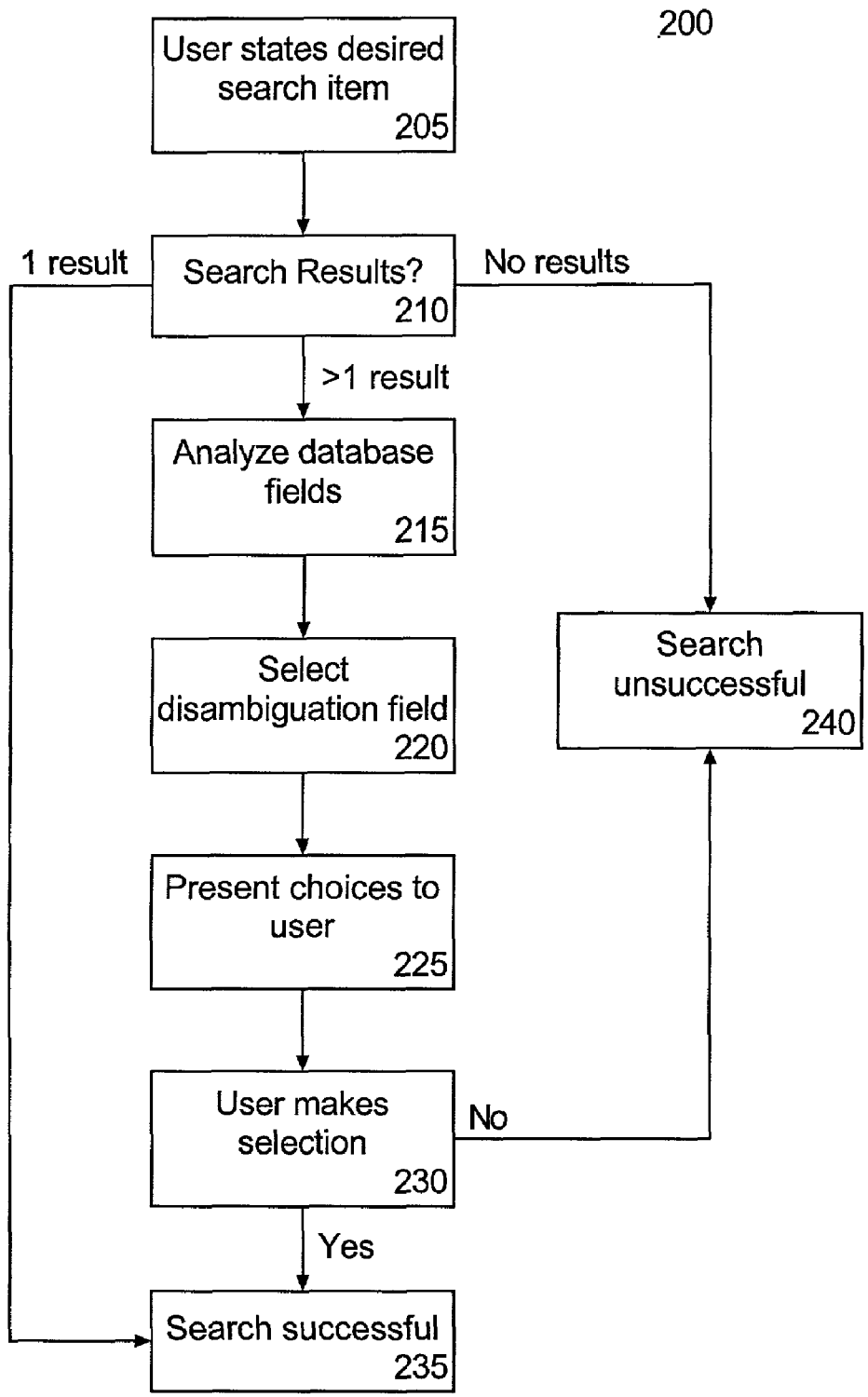
FIG. 2 is a flow chart illustrating a method of disambiguating multiple database entries in accordance with the inventive arrangements disclosed herein.

The invention disclosed herein provides a method and apparatus of disambiguating multiple database search results. More specifically, the present invention facilitates the presentation of multiple database search results through a speech interface such as a text-to-speech system. A suitable data field from the search results, which can be used to distinguish or disambiguate one search result from another, automatically can be determined. Through an analysis of the data fields and the contents of the data fields, one of the data fields of the search results can be selected as a disambiguation data field. The contents of the disambiguation data field then can be presented to a user through the speech interface so that the user can select the desired database search result. Accordingly, users can select a desired search result without having to view a listing of the search results on a display.

Those skilled in the art will recognize that the present invention can be used with any of a variety of speech-enabled systems which incorporate database and database search functions. Accordingly, although a speech-enabled directory assistance program has been used for purposes of illustration, the present invention is not so limited to the particular examples and embodiments as disclosed herein.

FIG. 1 illustrates a series of database entries identified responsive to a user search. A header row (top row) listing the data field names of the database and an analysis row (bottom row) have been included for purposes of illustration. Responsive to a database search for the name "Joe Smith" in the "Name" data field, the search has retrieved eight results. Each search result includes the name "Joe Smith" within the "Name" field of the database entry. As shown, the database entries include additional data fields such as "Formal Name", "Phone", "Location", "Job Description", "Dept. Number", and "Dept. Name". The present invention can process the search results, in accordance with predetermined criteria, to select a disambiguation field which includes data that not only can be properly played through a speech interface, but also can uniquely identify each of the entries.

In selecting a disambiguation data field, the search results can be processed to determine whether any of the data fields include duplicate data items. Data fields containing duplicate data items cannot uniquely identify each of the search results. Accordingly, these data fields can be failed as disambiguation data fields and excluded from further processing. For example, the "Name" and "Formal Name" data fields include duplicate items. These data fields can be excluded from further processing because neither field can uniquely identify each of the search result entries 1-8. Specifically, entries 1-8 each include the identical data item "Joe Smith" within the "Name" field. Entries 3, 7, and 8 include the identical data item "Joseph R. Smith" within the "Formal Name" data field. Notably, the "Formal Name" data field also includes other duplicate data items such as "Joe Smith".

The search results further can be processed to determine whether the data items within the data fields accurately can be pronounced through a speech interface. Those skilled in the art will recognize that this determination can be made using any of a variety of techniques such as using a dictionary to lookup data items or analyzing the patterns of vowels and consonants of the data items. As shown in FIG. 1, the data items within the "Phone" and "Dept. Number" data fields have been failed as possible disambiguation data fields because a determination has been made that one or more of the data items cannot be pronounced by the speech interface. In this case, these data fields include alphanumeric combinations rather than text words. Still, data fields can include text words which the speech interface is unable to pronounce. Such is the case, for example, if the text words are not included within a dictionary or include consonant-vowel combinations which are not specified in the speech interface. In any event, data fields including data items which cannot be pronounced can be excluded or failed as possible disambiguation fields.

The search results also can be processed to determine whether the lengths of the data items within the data item fields exceed a predetermined maximum length. Lengths of data items can be specified using any appropriate unit of measure such as characters, syllables, or words. The maximum length can be determined from an empirical analysis of the relative ease with which users recall and pronounce speech menu items of various lengths. If the data items for a particular data field exceed the maximum length, the data field can be excluded or failed as a disambiguation field. The length determination can be performed on a per data item basis such that if any one of the data items exceeds the maximum length, the data field can be excluded or failed as a disambiguation field. Alternatively, different statistical measures of the data item lengths can be calculated. Accordingly, as shown, the "Dept. Name" data field has been excluded because the data items are too long.

If the data items do not exceed the maximum length, the processing can continue. As shown, an average character length and syllable length from the data items in the "Location" data field and the "Job Description" data field have been determined. From these two data fields, the data field having the data items of the shortest average length can be selected as the disambiguation data field. Accordingly, the data items of the disambiguation data field can be presented through the speech interface as selections. For example, the directory assistance system can query the user as follows: "Found eight matches for this name, Please choose a location: United Kingdom, Las Vegas, West Palm Beach, Hursley, Chicago, Poughkeepsie, Austin, or Tucson".

FIG. 2 is a flow chart illustrating a method 200 of disambiguating multiple database entries. The method 200 can begin in step 205 where a user can initiate a database search for a particular data item. For example, a user can initiate a search for the name of a person such as "Joe Smith", a telephone number, or other data item for which the underlying database can be searched.

In step 210, if the database search does not retrieve any results, the search was unsuccessful. Accordingly, the method can continue to step 240 and end. If the database search retrieves a single record, then the search is successful. In that case, the method can continue to step 235 where a specified action can be taken such as providing the telephone number through a speech interface or connecting the user to the telephone number specified in the database search result.

If, however, the database search reveals more than one search result, the method can continue to step 215. In step 215, the search result data fields and contents, or data items, of the data fields can be processed. As previously mentioned, the data fields can be analyzed to determine data field contents which can be played through a speech interface and can uniquely identify each of the database search results. Accordingly, the processing can include determining whether data items of a data field can be pronounced by the speech interface, whether a data field uniquely identifies each search result (i.e. does not contain duplicate data items), as well as determining the individual lengths of data items and the average length of the data items within a particular data field. Data fields that comply with the aforementioned requirements can be identified and data fields that do not comply can be excluded from further processing. After completion of step 215, the method can continue to step 220.

In step 220, a data field whose contents can be played through a speech interface and which can be used to uniquely identify one of the entries from the search results can be selected automatically. For example, referring to FIG. 1, the "Location" data field can be selected as the disambiguation data field. Notably, the "Location" data field also includes data items having the smallest average length. In step 225, the search results can be presented to the user. In particular, each data item corresponding to the disambiguation data field of the search results can be played through the speech interface. As mentioned, a directory assistance system can query the user as follows: "Found eight matches for this name, Please choose a location: United Kingdom, Las Vegas, West Palm Beach, Hursley, Chicago, Poughkeepsie, Austin, or Tucson".

In an alternative embodiment of the invention, in the event that several disambiguation data fields are determined, the user can be queried as to which data field should be used. For example, referring to FIG. 1, the user can be notified that both the "Location" and the "Job Description" data fields can uniquely identify any one of the retrieved search results. Accordingly, the user can be queried to specify a particular data field and data item associated with that data field. Thus, if the user knows Joe Smith's job description or the location in which Joe Smith works, the user can specify the appropriate data field. The user also can provide the appropriate location or job description for Joe Smith as the case may be. For example, the user can state "location . . . Chicago" or "Job Description . . . Programmer". In another aspect of the invention, once the user specifies a preferred data field, the data items associated with the data field can be provided to the user automatically. In any event, after completion of step 225, the method can continue to step 230.

In step 230, the user can select one of the presented choices. For example, the user can say "Chicago", press a number corresponding to the selection, or say a number corresponding to the selection. If the user selects one of the presented choices, the search is successful and the method can continue to step 235. In step 235, any of a variety of specified actions can be taken such as providing the user with particular data items through the speech interface or connecting the user to the telephone number specified in the database entry. If, however, the user does not select one of the choices presented in step 230, the search is unsuccessful and the method can continue to step 240 and end.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of disambiguating database search results within a speech interface, the method comprising:
   retrieving multiple database entries responsive to a database search, wherein said retrieved database entries include a plurality of common data fields;
   processing the common data fields of said retrieved database entries, said processing comprising identifying at least one first data field having at least one data item that is unpronounceable, and excluding said at least one first data field from use as a disambiguation data field based on said identification;
   selecting a second data field from among said plurality of common data fields for use as a disambiguation data field for the retrieved database entries; and
   presenting, through the speech interface, data items corresponding to said selected disambiguation data field for each said retrieved database entry, wherein said speech interface is used in conjunction with a system in which said database search is performed, and wherein said speech interface provides users of said system with an interface for searching for information contained within a database in which said database search was conducted and for audibly receiving results of said database search.

2. The method of claim 1, wherein data item pronounceability is determined using at least one of a determination technique based upon a failed dictionary lookup with respect to a dictionary that contains pronounceable data items and a determination technique that analyzes patterns of consonant-vowel combinations occurring within the data items.

3. The method of claim 1, wherein said selecting step comprises:
   selecting the second data field based at least in part on an average length of data items of the second data field.

4. The method of claim 1, further comprising: receiving a user input specifying a data item associated with said selected second data field to disambiguate said retrieved database entries.

5. A computer-implemented method of disambiguating database search results within a speech interface, the method comprising:
   retrieving multiple database entries responsive to a database search, wherein said retrieved database entries include a plurality of common data fields;
   processing the common data fields of said retrieved database entries, said processing comprising identifying at least one first data field having at least one data item that exceeds a predetermined maximum length, and excluding said at least one first data field from use as a disambiguation data field based on said identification;
   selecting a second data field from among said plurality of common data fields for use as a disambiguation data field for the retrieved database entries; and
   presenting, through the speech interface, data items corresponding to said selected disambiguation data field for each said retrieved database entry, wherein said speech interface is used in conjunction with a system in which said database search is performed, and wherein said speech interface provides users of said system with an interface for searching for information contained within a database in which said database search was conducted and for audibly receiving results of said database search.

6. The method of claim 5, wherein the maximum length is determined from an empirical analysis of a relative ease with which users recall audibly presented speech items.

7. The method of claim 5, further comprising:
   receiving a user input specifying a data item associated with said selected second data field to disambiguate said retrieved database entries.

8. The method of claim 5, wherein said selecting step comprises: selecting the second data field based at least in part on an average length of data items of the second data field.

* * * * *